United States Patent
Yamamoto (10) Patent No.: US 8,366,510 B2
(45) Date of Patent: Feb. 5, 2013

(54) SHOOTING TOY

(75) Inventor: Atsushi Yamamoto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 818 days.

(21) Appl. No.: 12/521,053

(22) PCT Filed: Dec. 27, 2007

(86) PCT No.: PCT/JP2007/075198
§ 371 (c)(1),
(2), (4) Date: Jun. 24, 2009

(87) PCT Pub. No.: WO2008/081902
PCT Pub. Date: Jul. 10, 2008

(65) Prior Publication Data
US 2010/0093255 A1 Apr. 15, 2010

(30) Foreign Application Priority Data
Dec. 28, 2006 (JP) .................. 2006-354052

(51) Int. Cl.
*A63F 3/00* (2006.01)
(52) U.S. Cl. .......... 446/456; 446/175; 446/454
(58) Field of Classification Search .......... 446/175, 446/454–456
See application file for complete search history.

(56) References Cited

U.S. PATENT DOCUMENTS

| | | | |
|---|---|---|---|
| 2001/0045978 A1* | 11/2001 | McConnell et al. | 348/42 |
| 2002/0111117 A1* | 8/2002 | Ho et al. | 446/456 |
| 2005/0085159 A1* | 4/2005 | Yamaguchi et al. | 446/454 |
| 2005/0186884 A1* | 8/2005 | Evans | 446/456 |
| 2006/0183405 A1* | 8/2006 | Mathews | 446/456 |
| 2007/0293124 A1* | 12/2007 | Smith et al. | 446/454 |

FOREIGN PATENT DOCUMENTS

| | | |
|---|---|---|
| JP | 63-277081 A | 11/1988 |
| JP | 2000-262746 A | 9/2000 |
| JP | 2004-105631 A | 4/2004 |
| JP | U3119198 | 1/2006 |

* cited by examiner

*Primary Examiner* — Dmitry Suhol
*Assistant Examiner* — Alex F. R. P. Rada, II
(74) *Attorney, Agent, or Firm* — Rankin, Hill & Clark LLP

(57) ABSTRACT

A shooting toy where players determine whether or not a shot has hit a target based on image recognition is provided. A determination section (43) of a controller (5) determines whether or not the shot has hit the target based on image recognition by comparing a target image to be recognized, acquired by a target image data acquiring section (41) with a reference image stored in a reference image data storing section (45). A game executing section (35) proceeds with the game based on a hit signal outputted from the determination section (43).

7 Claims, 10 Drawing Sheets

SHOOTING TOY

TECHNICAL FIELD

The present invention relates to a shooting toy that captures an image of an object located in an area surrounding a movable toy having an image capturing section such as a camera mounted thereto, and proceeds with a game based on the captured image of the object.

BACKGROUND ART

Japanese Patent Application Publication No. 2004-105631 (JP2004-105631A: Patent Document 1) discloses a shooting toy in which an image signal of an image captured by a camera (image capturing section), which is mounted to a remotely controllable toy that is controlled by a controller, is transmitted to the controller and the captured image is displayed on a monitor connected to the controller, based on the image signal. In playing such shooting toy, a player operates the remotely controllable toy (movable toy) based on image information displayed on the monitor. The remotely controllable toy transmits an infrared signal as an imaginary bullet to a target to be shot (hereinafter referred to as target) according to operation of the controller, and the target transmits a hit signal to the controller when it has received the infrared signal. The controller displays a given image on the monitor when it has received the hit signal.
Patent Document 1: Japanese Patent Application Publication No. 2004-105631 (JP2004-105631A)

DISCLOSURE OF THE INVENTION

Problem to be Solved by the Invention

In a typical shooting toy, a movable toy transmits an infrared signal as an imaginary bullet so that it may be determined whether or not the bullet has hit the target, based on whether or not the target receives the infrared signal. Thus the shooting toy needs to dispose an imaginary bullet shooting section such as infrared LED in the movable toy and dispose an infrared signal receiving section for receiving the infrared signal as the imaginary bullet in the target.

Further, the target needs to include a signal transmitting section that transmits a hit signal to the controller, etc. so as to notify the player that the imaginary bullet have hit the target. Objects having no signal transmitting section cannot be a target. Since different kinds of signals have to be transmitted/received among the controller, movable toy, and target, the configuration of the signal transmitting section and the signal receiving section of the shooting toy is inevitably complicated due to the necessity of transmitting and receiving various kinds of signals.

A purpose of the present invention is to provide a shooting toy in which whether or not a shooting has hit a target is determined by means of image recognition.

Another purpose of the present invention is to provide a shooting toy in which objects having no signal transmitting section can be a target.

A further purpose of the present invention is to provide a shooting toy in which a hit shot can be confirmed visually, aurally, or tactually.

Still another purpose of the present invention is to provide a shooting toy in which a battle game can be played by watching images captured by an opponent player's movable toy.

Yet another purpose of the present invention is to provide a shooting toy in which whether or not a shooting has hit the target can be determined by a simple image recognition technique.

Means for Solving Problem

A shooting toy according to the present invention comprises a controller that generates a control signal and a movable toy that is remotely controllable based on the control signal outputted from the controller. The movable toy includes an image capturing section and an image signal transmitting section. The image capturing section captures an image of an object located in an area in which the movable toy exists and outputs an image signal of the captured image to the image signal transmitting section. How to configure the image capturing section is arbitrary, and it may be formed of a miniature CCD camera and so on. The image signal transmitting section transmits an image signal of the image captured by the image capturing section to the controller. How to configure the image signal transmitting section is arbitrary, and image signals may be transmitted to the controller either wirelessly or via a cable. In the present disclosure, the term "object" means an object of which image is captured by the image capturing section and may include either a still object such as a target mark or a movable object such as a movable body controlled by an opponent player.

The controller includes an image signal receiving section, an image displaying section, and a game executing section. The image signal receiving section receives the image signal transmitted from the image signal transmitting section of the movable toy and outputs it to the image displaying section. The image displaying section displays the image captured by the image capturing section on a display screen such as a monitor, based on the image signal received by the image signal receiving section. The display screen may be disposed in the controller or may be provided separately from the controller. The game executing section executes the shooting game using the image displayed on the image displaying section.

In particular, the controller of the shooting toy according to the present invention further includes a reference image data storing section, a start shooting command generating section, a target image data acquiring section, and a determination section. The reference image data storing section stores reference image data about one or more reference images that are necessary to recognize a target to be shot as an image. The reference image data storing section may store prepared reference image data in advance. However, the reference image data storing section may store newly-prepared reference image data created based on images captured by the image capturing section. The reference image may be either a whole or partial portion of the image of the target. The reference image may be an image of an identification indication formed of a character, a symbol, or a figure displayed on an outer surface of the object that may be the target. If images of such identification indication are the reference images, all you have to do is just to recognize the identification indication as an image, thereby simplifying the image recognition.

The start shooting command generating section outputs to the target image data acquiring section a start shooting command to start shooting based on an operation by a player. Namely, the player operates an operation portion such as a button disposed on the surface of the controller upon shooting. The start shooting command generating section generates a start shooting command in response to the operation.

The target image data acquiring section determines an image displayed on the display screen as a target image at the time that the start shooting command is generated, and acquires target image data about the target image from the image signal. The target image data acquiring section further outputs the acquired target image data to the determination section.

The determination section determines whether or not the object included in the target image data is the target defined by the reference image data by means of image recognition by comparing the reference image data stored in the reference image data storing section with the target image data when the target image data is outputted from the target image data acquiring section.

The determination section determines whether or not the object whose image is displayed as the target image is the target based on the target image data and the reference image data, and outputs a hit signal to the game executing section if the object whose image is displayed as the target image is determined to be the target. The determination section outputs a non-hit signal to the game executing section if the object whose image is displayed as the target image is determined not to be the target based on the target image data and the reference image data. Then, the game executing section proceeds with the game based on the hit signal and non-hit signal. With such configuration, it may be determined whether or not the shot has hit the target or shooting has resulted in hitting the target by means of image recognition without using infrared signal used for shooting or signal transmitting section to confirm the hit shot. What is more, since it is not necessary to provide the target with the signal transmitting section, any object can be chosen arbitrarily as the target.

The game executing section may be configured to proceed with the game by validating all the hit signals. With such configuration, since it may be determined that the shot has hit the target only if an object as the target is displayed on the display screen at the time that the start shooting command is generated, players can easily understand the current status of the game proceeding. The game executing section may proceeds with the shooting game by validating the hit signal only if a given requirement has been satisfied after the hit signal has been received. The given requirement may be an operation by the player applied within a predetermined time after the hit signal has been outputted, for example. In such configuration, the start shooting command generating section may have a function of generating a validate shooting command based on an operation by the player after the start shooting command has been outputted. Here, since the hit signal is not validated unless the validate shooting command has been generated within a predetermined time period after the hit signal has been outputted, it is not determined that the shot has hit the target. Accordingly, the predetermined time period after the hit signal has been outputted can be regarded as a time period during which the target is being captured or in a lock-on state, and it may be configured that the shot has hit the target only in the lock-on state. As a result, the proceeding of the game can be more thrilling.

The player may be notified that the hit signal has been validated or the shot has hit the target. How to indicate that the hit signal has been validated is arbitrary. For example, it may be known to the player visually, aurally, or tactually. When the hit shot is to be confirmed visually, a hit image displaying section may be provided in the controller to display an image of the hit shot on the display screen so that the player may visually confirm the hit shot. When the hit shot is to be confirmed aurally or tactually, a sound producing section or a vibration generating section that vibrates the controller may be provided in the controller. With such configuration, since the player can confirm whether or not the shot has hit the target, the game can be much more thrilling.

When the shooting game is played as a battle game between a player and an opponent player using two or more shooting toys, the controller may be configured to further include a communication section that has a function of communicating with a controller of the opponent player's shooting toy. The contents of information communicated between the mutual communication sections are arbitrary, and may be typically an image signal obtained from the player's movable toy and transmitted to the opponent player's controller, or an image signal obtained by the opponent player's movable toy and transmitted therefrom via the opponent player's controller to the player's controller. For such configuration, the display screen includes a first split display screen and a second split display screen. The image displaying section may be configured to display on the first split display screen an image captured by the image capturing section based on the image signal received from the movable toy operated by the player, and display on the second split display screen an image captured by an image capturing section of a movable toy of the opponent player based on an image signal transmitted from a controller of the opponent player. In this manner, the player can watch images being captured by the image capturing section of the movable toy operated by the opponent player. This allows the player to know whether or not the image captured on the opponent player's side includes an object that may become the target, or whether or not a shot from the opponent player's toy will hit the target. Accordingly, pleasure of working out strategies in the shooting game battle with the opponent player can increase.

If the shooting game is played as a battle game with the opponent player, the game executing section may be configured to proceed with the game by validating all the hit signals, or configured to validate the hit signal only if the validate shooting command has been generated within a predetermined time period after the hit signal has been outputted. In such configuration, the controller may further include a hit notifying section and a shot image displaying section. The hit notifying section notifies the opponent player's controller via the communication section that the hit signal has been validated once the hit signal has been validated. The shot image displaying section displays an image of being shot on the second split display screen when it is notified from the opponent player's controller via the communication section that the hit signal has been validated. In this manner, since an image of hit shot is displayed on the opponent player's second split display screen when the shot has hit the target, players can promptly confirm that the opponent player's shooting toy has hit the target, thereby increasing pleasure in the game play.

The reference image stored in the reference image data storing section may be an arbitrary image. Namely, it may be a whole or partial image of an object that may become the target. An identification indication formed of a character, a symbol, or a figure may be displayed on an outer surface of the object that may become the target. In this case, the one or more reference images stored in the reference image data storing section may be the identification indications. With such configuration, image recognition can be simplified.

The target may be a movable toy of an opponent player. With such configuration, the player is required not only to hit the opponent player's movable toy but also to move the movable toy to avoid the opponent player's shooting. Thus pleasure of planning strategies further increases. In particular, as described above, if the display screen of the image displaying section is constituted from the first split display screen and the second split display screen and an image captured by the image capturing section of the movable toy of the opponent player is displayed on the second split display screen based on an image signal transmitted from the controller of the opponent player, the player can know whether or not an image of the movable toy operated by the player is now captured by the opponent player's image capturing section, namely, whether or not the movable toy operated by the player will be shot. Thus pleasure of the game play can increase.

The image capturing section may have a zooming function. Here, the captured image is expanded with the zooming function at the same time that the start shooting command is generated. Such configuration may also make it possible to expand an image of the target displayed as the target image, thereby simplifying image recognition.

The target image data acquiring section may acquire only an image portion of the target image located in a central portion thereof as the target image data. With such configuration, if the target is located in a portion other than the central portion of the target image, the determination section determines that the object displayed as the target image is not the target. Accordingly, since the player is required to operate the movable toy so as to locate the target in the central portion of the target image, thereby increasing pleasure in working out strategies. In addition, since only the image portion located in the central portion thereof is subject to determination operation, image recognition can be simplified.

The configuration of the present invention as described above is summarized hereinbelow.

(1) A shooting toy comprises a controller that generates a control signal and a movable toy that is remotely controllable with the control signal. The movable toy includes an image capturing section that captures an image of an object located in an area in which the movable toy exist, and an image signal transmitting section that transmits an image signal outputted from the image capturing section to the controller. The controller includes an image signal receiving section that receives the image signal; an image displaying section that displays an image captured by the image capturing section on a display screen, which includes a first split display screen and a second split display screen, based on the received image signal; a game executing section that executes a shooting game using the captured image; a reference image data storing section that stores reference image data about one or more reference images that are necessary to recognize a target to be shot as an image; a start shooting command generating section that generates a start shooting command to start shooting based on an operation by a player; a target image data acquiring section that determines as a target image to be recognized (hereinafter referred to as target image) an image displayed on the display screen at the time that the start shooting command is generated, and acquires from the image signal target image data about the target image; a determination section that determines whether or not the object whose image is displayed as the target image is the target based on the target image data and the reference image data, and outputs a hit signal if the object whose image is displayed as the target image is determined to be the target, and outputs a non-hit signal if the object whose image is displayed as the target image is determined not to be the target; and a communication section that communicates with a controller of an opponent player's shooting toy. The image displaying section displays on the first split display screen an image captured by the image capturing section based on the image signal received from the movable toy, and on the second split display screen an image captured by an image capturing section of a movable toy of the opponent player based on an image signal transmitted from a controller of the opponent player. The game executing section proceeds with the shooting game based on the hit signal and non-hit signal.

(2) In the shooting toy of (1), the game executing section may be configured to proceed with the game by validating all the hit signals. The controller may include a hit notifying section that notifies the opponent player's controller via the communication section that the hit signal has been validated once the hit signal has been validated, and a shot image displaying section that displays an image of being shot on the second split display screen when it is notified from the opponent player's controller via the communication section that the hit signal has been validated.

(3) In the shooting toy of (2), the controller may include at least one of a hit image displaying section that displays on the display screen an image allowing the hit shot to be visually confirmed, a sound producing section that produces a sound allowing the hit shot to be aurally confirmed, and a vibration generating section that vibrates the controller to allow the hit shot to be tactually confirmed once the hit signal has been validated.

(4) In the shooting toy of (1), the start shooting command generating section may have a function of generating a validate shooting command with an operation by the player after generating the start shooting command and the game executing section proceeds with the shooting game by validating the hit signal only if the validate shooting command has been generated within a predetermined time period after the hit signal has been outputted. The controller may include a hit notifying section that notifies the opponent player's controller via the communication section that the hit signal has been validated once the hit signal has been validated, and a shot image displaying section that displays an image of being shot on the second split display screen when it is notified from the opponent player's controller via the communication section that the hit signal has been validated.

(5) In the shooting toy of (4), the controller may include at least one of a hit image displaying section that displays on the display screen an image allowing the hit shot to be visually confirmed, a sound producing section that produces a sound allowing the hit shot to be aurally confirmed, and a vibration generating section that vibrates the controller to allow the hit shot to be tactually confirmed once the hit signal has been validated.

(6) In the shooting toy of (1), an identification indication formed of a character, a symbol, or a figure may be displayed on an outer surface of the object that may become the target, and the one or more reference images stored in the reference image data storing section are images of the identification indications.

(7) In the shooting toy of (1), the target image data acquiring section may acquire only an image portion of the target image located in a central portion thereof as the target image data.

(8) A shooting toy comprises a controller that generates a control signal and a movable toy that is remotely controllable with the control signal. The movable toy includes an image capturing section that captures an image of an object located in an area in which the movable toy exist, and an image signal transmitting section that transmits an image signal outputted from the image capturing section to the controller. The controller includes an image signal receiving section that receives the image signal; an image displaying section that displays an image captured by the image capturing section on a display screen based on the received image signal; a game executing section that executes a shooting game using the captured image; a reference image data storing section that stores reference image data about one or more reference images that are necessary to recognize a target to be shot as an image; a start shooting command generating section that generates a start shooting command to start shooting based on an operation by a player; a target image data acquiring section that determines as a target image an image displayed on the display screen at the time that the start shooting command is generated, and acquires from the image signal target image data about the target image; and a determination section that determines whether or not the object whose image is displayed as the target image is the target based on the target image data and the reference image data, and outputs a hit signal if the object whose image is displayed as the target image is determined to be the target, and outputs a non-hit signal if the object whose image is displayed as the target image is determined not to be the target. The game executing section proceeds with the shooting game based on the hit signal and non-hit signal.

(9) In the shooting toy of (8), the game executing section is configured to proceed with the game by validating all the hit signals.

(10) In the shooting toy of (9), the controller may include at least one of a hit image displaying section that displays on the display screen an image allowing the hit shot to be visually confirmed, a sound producing section that produces a sound allowing the hit shot to be aurally confirmed, and a vibration generating section that vibrates the controller to allow the hit shot to be tactually confirmed once the hit signal has been validated.

(11) In the shooting toy of (8), the start shooting command generating section may have a function of generating a validate shooting command with an operation by the player after generating the start shooting command, and the game executing section proceeds with the shooting game by validating the hit signal only if the validate shooting command has been generated within a predetermined time period after the hit signal has been outputted.

(12) In the shooting toy of (11), the controller may include at least one of a hit image displaying section that displays on the display screen an image allowing the hit shot to be visually confirmed, a sound producing section that produces a sound allowing the hit shot to be aurally confirmed, and a vibration generating section that vibrates the controller to allow the hit shot to be tactually confirmed once the hit signal has been validated.

(13) In the shooting toy of (8), the target may be a movable toy of an opponent player.

(14) In the shooting toy of (8), the image capturing section may have a zooming function and use the zooming function of expanding a captured image at the same time that the start shooting command is generated.

(15) In the shooting toy of (8), an identification indication formed of a character, a symbol, or a figure may be displayed on an outer surface of the object that may become the target, and the one or more reference images stored in the reference image data storing section are images of the identification indications.

(16) In the shooting toy of (8), the target image data acquiring section may acquire only an image portion of the target image located in a central portion thereof as the target image data.

BEST MODE FOR CARRYING OUT THE INVENTION

Figure 1:
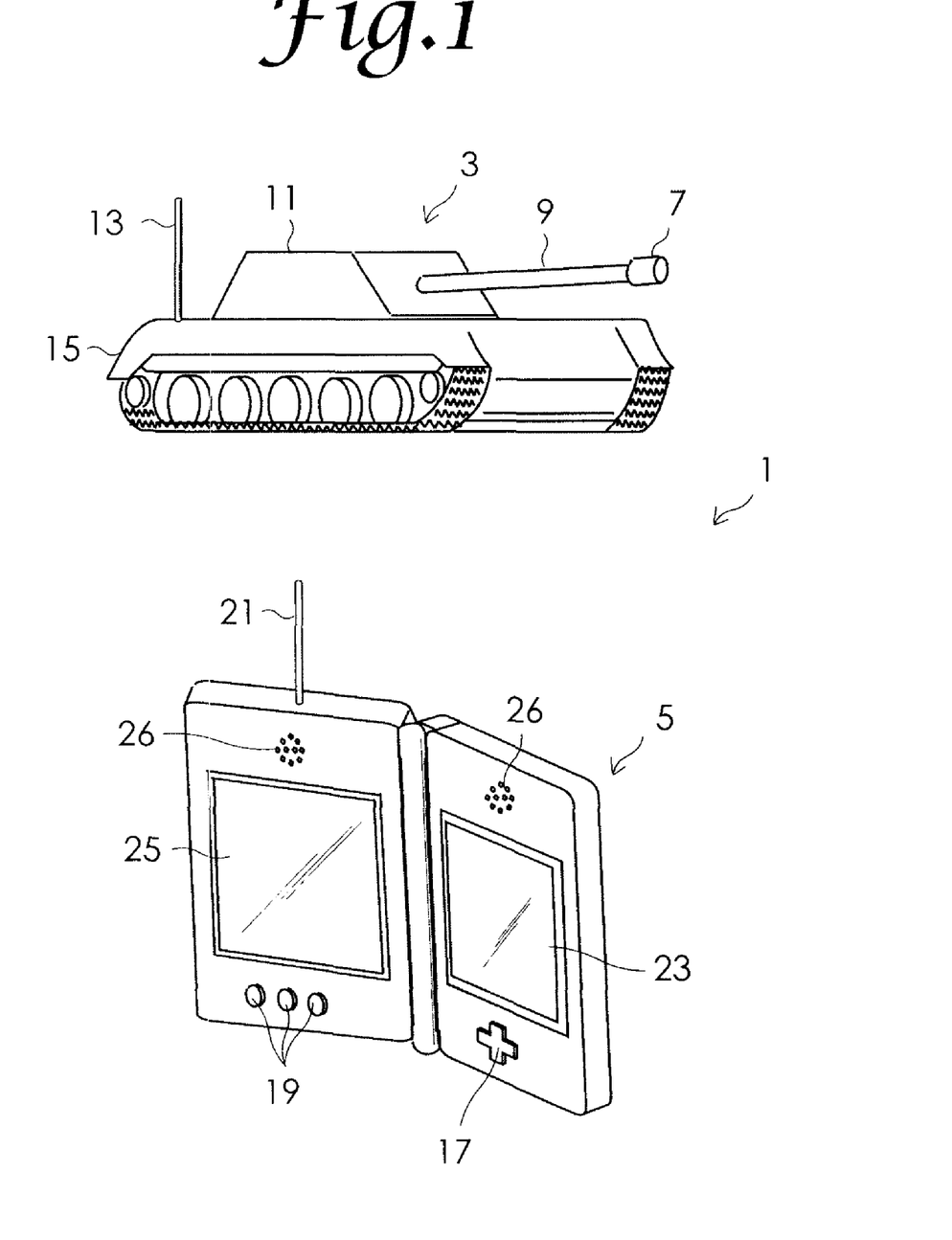
FIG. 1 illustrates a toy tank as a movable toy and a controller of a shooting toy according to one embodiment of the present invention.

Preferred embodiments of a shooting toy according to the present invention will be described hereinafter with reference to the drawings. FIG. 1 shows an exemplary embodiment of the present invention where a movable toy of the shooting toy is a toy tank. The shooting toy 1 includes a toy tank 3 and a controller 5 that remotely controls the toy tank 3. In this example, an opponent player also has a shooting toy of the same configuration and operates it in a battle game. The shooting target is determined to be the toy tank operated by the opponent player. The toy tank 3 includes a gun turret portion 11 and a tank body portion 15. The gun turret portion 11 includes a gun barrel 9 having an image capturing element 7 at the end thereof and the image capturing element 7 includes a camera lens. The tank body portion 15 is equipped with an antenna 13 for transmitting and receiving signals between the controller 5. The camera may be configured arbitrarily, and may be a miniature camera such as CCD camera, which is typically employed for a camera portion of a mobile phone, etc. The camera has a zooming function to expand a captured image. The camera is also capable of converting the data of the captured image into an image signal. The image signal outputted from the image capturing element 7 is processed in a signal processing circuit disposed in the tank body portion 15 and transmitted to an after-mentioned image signal transmitting section 31. A gun barrel driving mechanism, which drives the gun barrel 9 upward and downward based on a control signal received via the antenna 13, is built in the gun turret portion 11. A gun turret portion rotating mechanism, which enables the gun turret portion 11 to rotate with respect to the tank body portion 15 based on the control signal received via the antenna 13, is also built in the gun turret portion 11. The signal processing circuit disposed in the tank body portion 15 receives various kinds of control signals including those for operating the gun barrel 9 and gun turret portion 11 via the antenna 13 disposed in the tank body portion 15. With such configuration, the player can freely change an image-capturing area, image-capturing direction and/or a size of an object to be image-captured by operating the controller.

Figure 2:
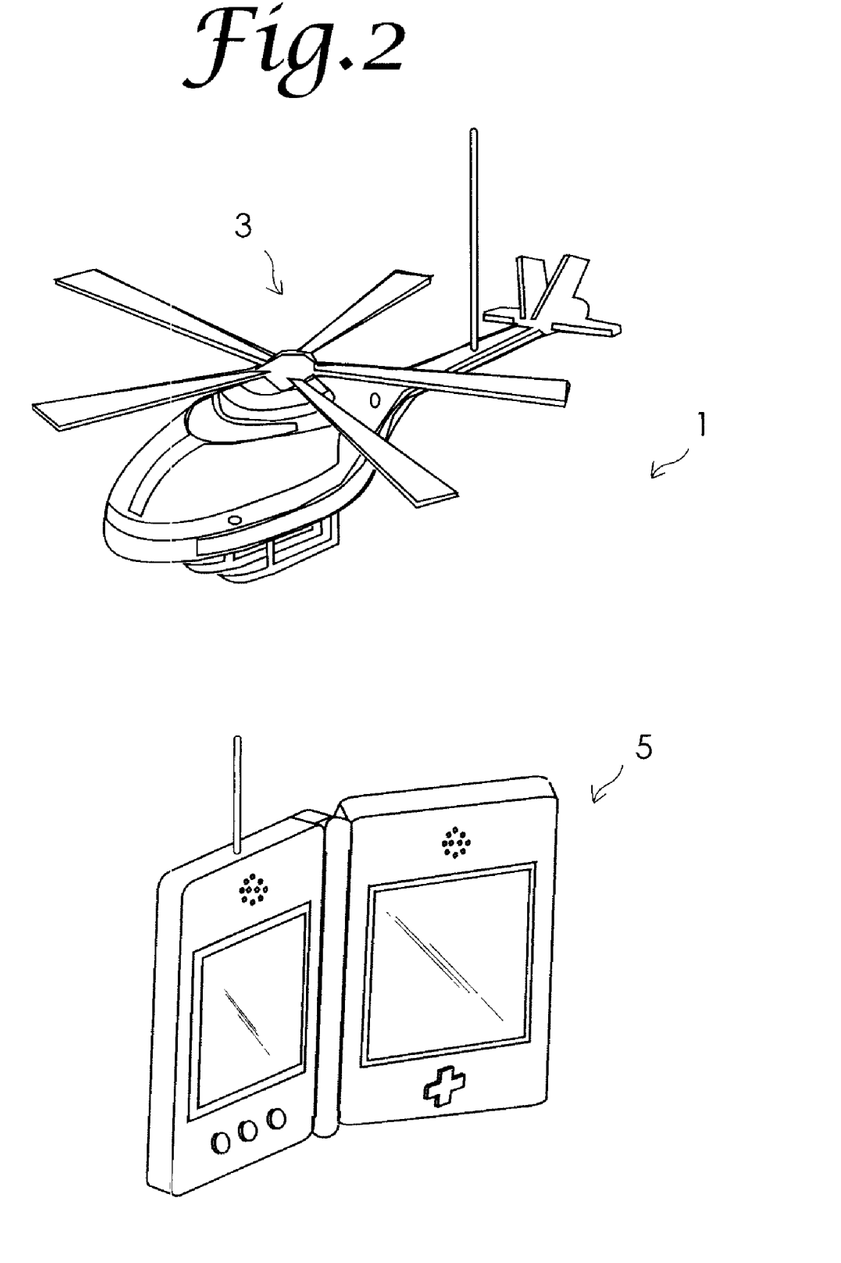
FIG. 2 illustrates a toy helicopter as a movable toy and a controller of a shooting toy according to one embodiment of the present invention.
Figure 3:
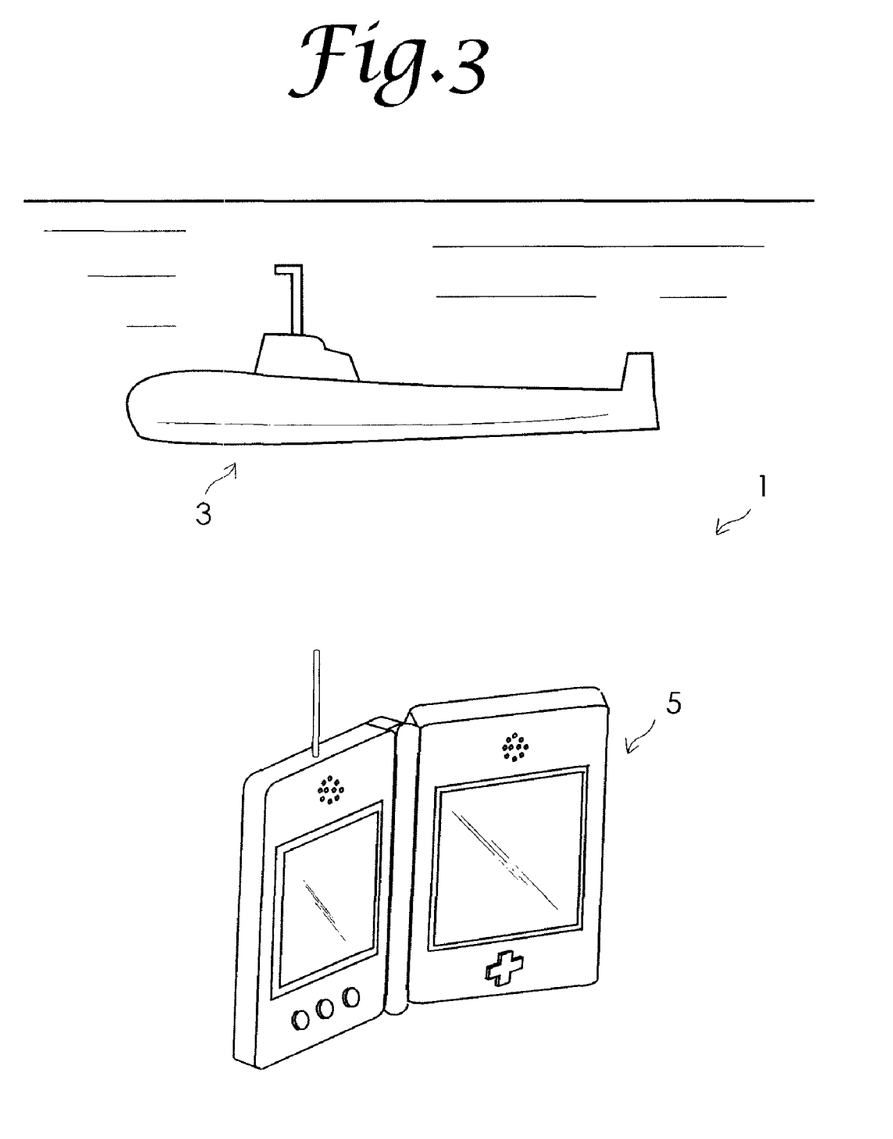
FIG. 3 illustrates a toy submarine as a movable toy and a controller of a shooting toy according to one embodiment of the present invention.

The tank body portion 15 includes a moving mechanism that changes the moving direction and moving velocity of the toy tank 3 based on operational control signals received via the antenna 13. The moving mechanism is configured to include an electric cell that functions as the power source, a motor as the driving source, a motor controlling circuit and an operation mechanism including a caterpillar. In the present embodiment, though reception and transmission of control signals are carried out via the same antenna, the toy tank 3 may be equipped with two antennas so as to receive the control signal and transmit the image signal separately. Various components including a circuit substrate, on which a signal processing circuit for the camera, a controlling circuit for the driving mechanism, etc. are mounted, are built in the toy tank 3. Though transmission/reception of the control signal and image signal are carried out wirelessly by means of radio wave signal according to the present embodiment, it may be carried out via a cable, etc. connecting the toy tank 3 and the controller 5. Further, though the movable toy according to the present embodiment is configured to have a tank-like appearance, the present invention may be also applied to a movable toy that moves in the air such as a helicopter (FIG. 2) and a fighter aircraft or a movable toy that moves underwater such as a submarine (FIG. 3).

As shown in FIG. 1, the controller 5 includes a cross-shaped key 17, a button 19, an antenna 21, a first split display screen 23 and a second split display screen 25. The player operates the cross-shaped key and the button 19 to control operation of the toy tank 3. Results of the operation are converted into electric signals and outputted to an after-mentioned control signal generating section 33. The player proceeds with the game by operating the cross-shaped key 17 and the button 19. A control signal generated with the operation of the cross-shaped key 17 and/or the button 19 is transmitted via the antenna 21 to the toy tank 3. The antenna 21 also receives an image signal transmitted from the toy tank 3. The image signal received by the antenna 21 is displayed on the first split display screen 23. In proceeding with the game, the player determines operation of the toy tank 3 or outputs an after-mentioned start shooting command or a validate shooting command by operating the cross-shaped key 17 and the button 19 based on the images displayed on the first split display screen 23. The controller 5 also includes in its housing case a sound emitting portion 26 that emits a sound from a speaker, which is built in the controller 5 in the vicinity of the first split display screen 23 and the second split display screen 25.

Figure 4:
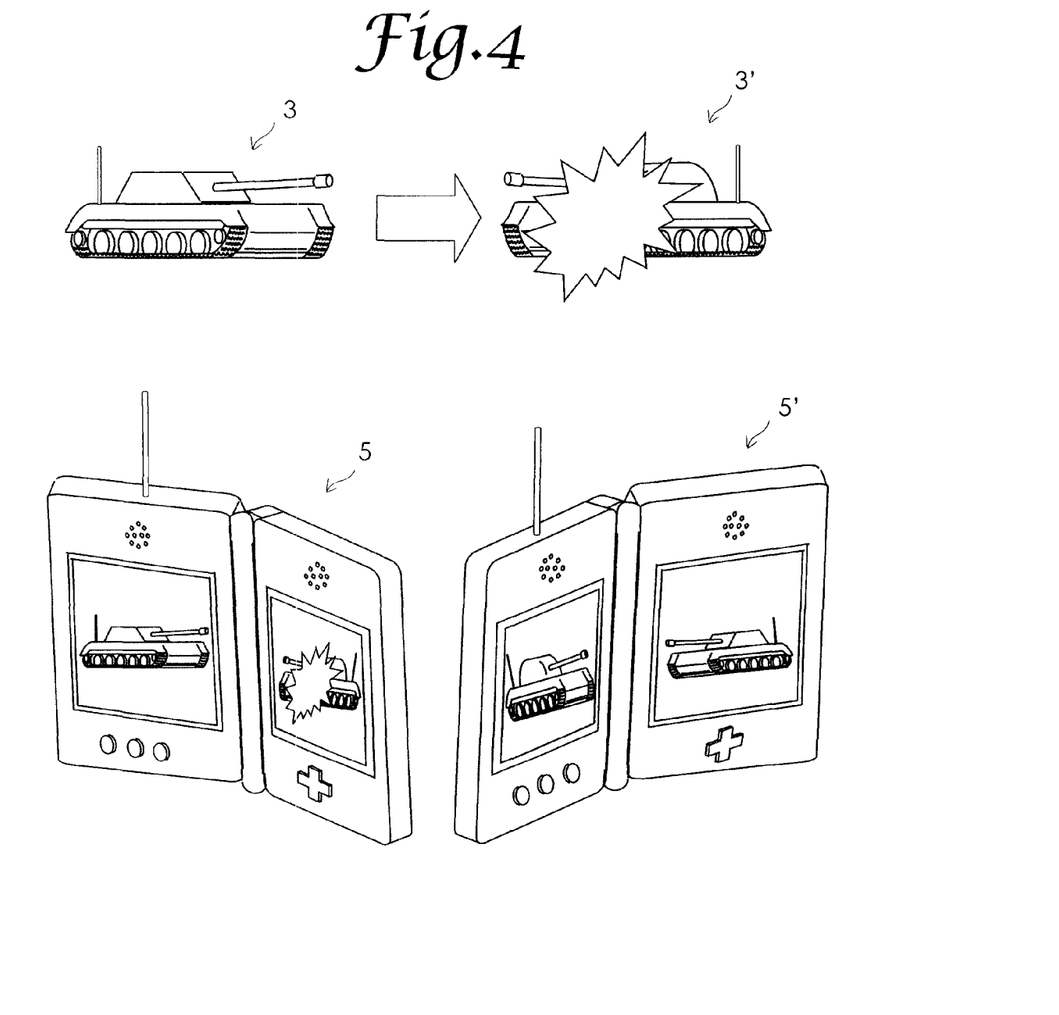
FIG. 4 illustrates a battle game played using the shooting toy according to the embodiment of FIG. 1.

FIG. 4 is an exemplary view of a shooting battle game played by two players, a player and an opponent player, for example, each having a shooting toy, where each player aims at the other player's toy tank 3 or 3' as the target. In the shooting game, a controller 5 transmits and receives signals not only with its toy tank 3 but also with the opponent's controller 5' via the antenna 21. Namely, an image signal transmitted from the toy tank 3 operated by the player is also transmitted to the opponent player's controller 5'. Similarly, an image signal of an image captured by the opponent player's toy tank 3', which is transmitted from the opponent player's controller 5', is received by the player's controller 5. In this manner, the player can see both images captured by the toy tank 3 and the opponent player's toy tank 3' simultaneously on first and second split display screens 23 and 25 of the player's controller respectively. The controllers 5 and 5' further have a function of transmitting and receiving therebetween a signal that notifies the opponent player's controller 5' of the hit shot once a hit signal has been validated as described hereinbelow. The image captured by the opponent player's toy tank 3' and received from the opponent player's controller 5' is displayed on the second split display screen 25.

According to the present embodiment, as discussed later, the second split display screen 25 displays thereon an image of being shot if a signal telling that the hit signal has been validated has been transmitted from the opponent player's controller 5'. Though the controller 5 includes the first and second split display screens 23 and 25 according to the present embodiment, these split display screens may be provided separately from the controller 5, of course. Also, according to the present embodiment, the first split display screen 23 and the second split display screen 25 are independent of each other and separately disposed on either of the cover portion or body portion of the controller 5. However, the first and second split display screens may be constituted from one display screen divided into two windows. In this configuration, a display screen may be divided vertically or horizontally in the middle and define one of the divided screens as a first split display screen and the other as a second split display screen. Or the first split display screen may occupy most of the displaying portion, and the second split display screen may be inserted into the first split display screen just in a corner portion thereof.

Figure 5:
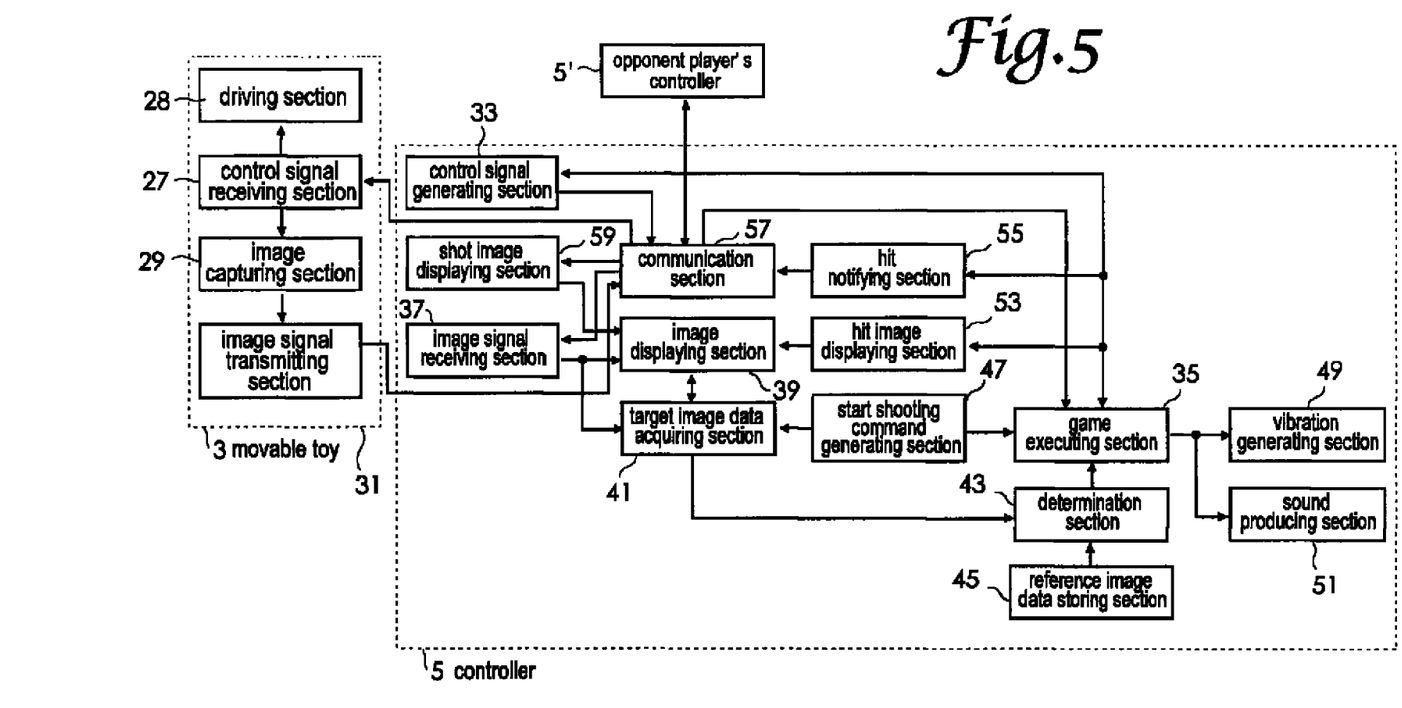
FIG. 5 is a block diagram showing a configuration of a control system of the movable toy and the controller for use in the shooting toy according to one embodiment of the present invention.

FIG. 5 is a block diagram partially showing a signal processing circuit configuration which is divided and disposed in the toy tank 3 and the controller 5 of the shooting toy 1. The signal processing circuit includes a control signal receiving section 27, a driving section 28, an image capturing section 29 and an image signal transmitting section 31 in the toy tank 3. The signal processing circuit also includes a control signal generating section 33, a game executing section 35, an image signal receiving section 37, an image displaying section 39, a target image data acquiring section 41, a determination section 43, a reference image data storing section 45, a start shooting command generating section 47, a vibration generating section 49, a sound producing section 51, a hit image displaying section 53, a hit notifying section 55, a communication section 57 and a shot image displaying section 59 in the controller 5.

The control signal generating section 33 outputs a control signal necessary for moving the toy tank 3 when the cross-shaped button 17 or buttons 19 of FIG. 1 are operated. The control signal generating section 33 may generates a control signal in response to a command from the game executing section 35. The control signal generating section 33 transmits the control signal to the control signal receiving section 27 disposed in the toy tank 3 via the communication section 57 including the antenna 21. The control signal receiving section 27 outputs the received control signal at least to the driving section 28. The driving section 28 controls motion of the toy tank 3 based on the control signal outputted from the control signal receiving section 27. In addition to the control signal, the control signal receiving section 27 also receives a command signal for the image capturing section 29 transmitted from the communication section 57 in the controller 5.

The image capturing section 29 is always capturing view images ahead of the image capturing element 7 of the camera and keeps outputting image signals. The image capturing section 29 of the present embodiment has a zooming function. The image capturing section 29 expands the captured image when a command signal is inputted based on a start shooting command outputted from the start shooting command generating section 47. The start shooting command is generated from the start shooting command generating section 47 in accordance with the operation of the buttons 19 operated by the player. The start shooting command is outputted into the control signal generating section 33 from the start shooting command generating section 47 via the game executing section 35, and transmitted to the toy tank 3 along with the control signal. The start shooting command is further outputted to the target image data acquiring section 41 as discussed later.

The image signal transmitting section 31 transmits an image signal of an image captured by the image capturing section 29 via the antenna 13 to the image signal receiving section 37 via the communication section 57 provided in the controller 5. The image signal receiving section 37 outputs the received image signal to the image displaying section 39. The image displaying section 39 displays the image captured by the image capturing section 29 on the first split display screen 23 based on the inputted image signal. As will be discussed later, in the present embodiment, the image displaying section 39 displays on the second split display screen 25 an image that is based on the image signal captured by the opponent player's toy tank 3' and transmitted from the opponent player's controller.

Figure 6:
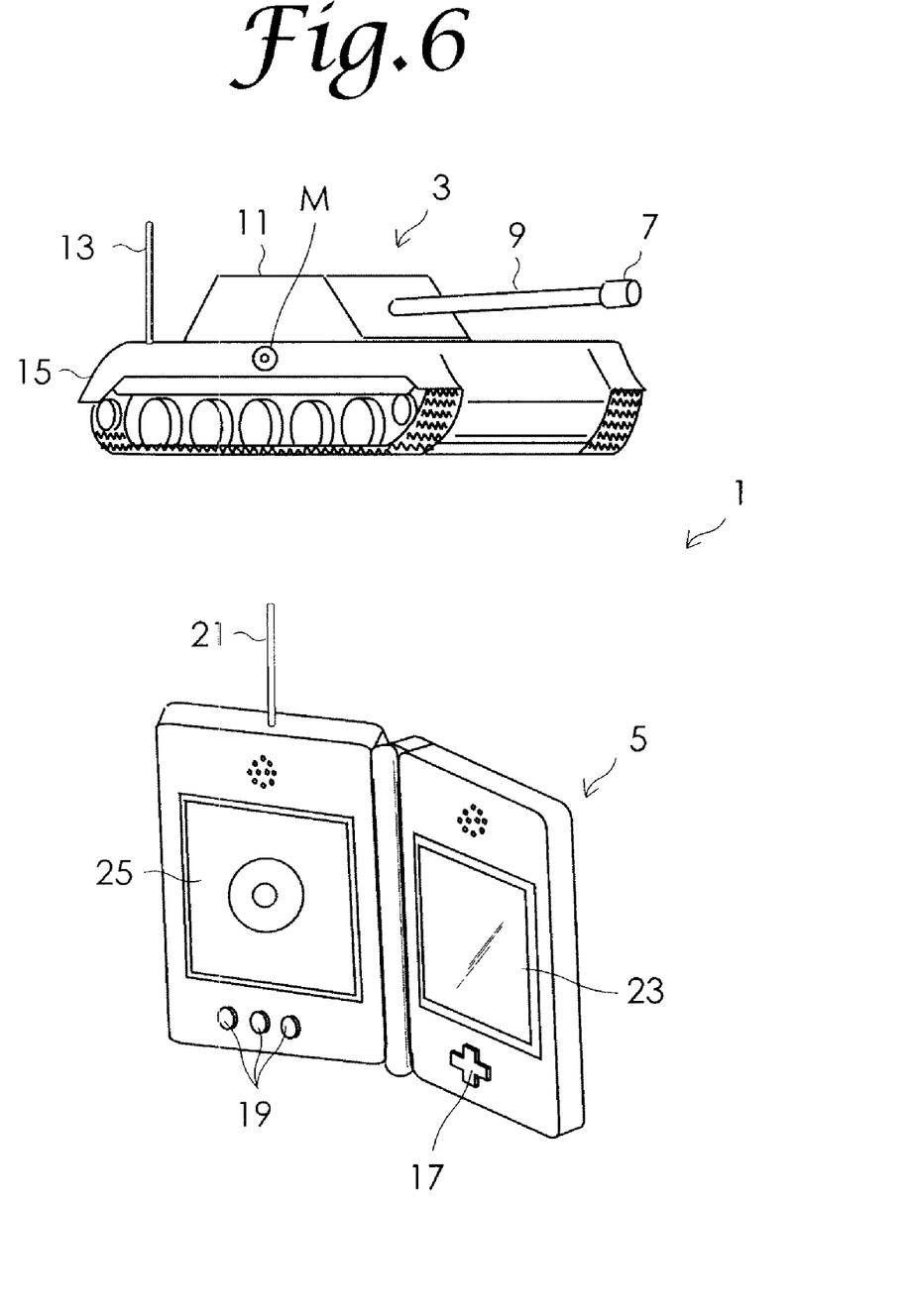
FIG. 6 illustrates a shooting toy with an identification indication displayed on an outer surface of a target.

The target image data acquiring section 41 determines, as a target image, an image displayed on the first split display screen 23 at the time that the start shooting command is outputted from the start shooting command generating section 47, and acquires from the image signal target image data about the target image. The target image data acquiring section 41 outputs the acquired target image data to the determination section 43. The determination section 43 compares the target image data outputted from the target image data acquiring section 41 with reference image data stored in the reference image data storing section 45, and determines whether or not an object of which image is included in the target image data is the target defined by the reference image data. How to configure the reference image data storing section 45 is arbitrary. For example, previously-prepared reference image data may be stored in advance. Alternatively, the reference image data storing section 45 may store newly-prepared reference image data created based on images captured by the image capturing section 29. If the reference image data is the newly-created data based on the images captured by the image capturing section 29, the player can select any object arbitrarily as the target. What is more, how to configure the reference image to be stored is also arbitrary. Namely, either a whole or partial image of the target may become the reference image. As sown in FIG. 6, an identification indication M, which is formed of a character, a symbol, or a figure, may be displayed on an outer surface of the target, and the reference image may be an image of the identification indication M of the character, the symbol or the figure displayed on the outer surface of the target. If images of such identification indication M are the reference images, all you have to do is just to recognize the identification indication M as an image, so the image recognition becomes quite simple. In the present embodiment, to simplify the image capturing of the identification indication M, the image capturing section 29 has an additional zooming function of obtaining the largest possible view of the identification indication M using the zooming function at the time that the start shooting command is outputted.

The determination section 43 determines whether or not an object displayed as the target image is the target based on the target image data and the reference image data. If the object displayed as the target image is determined to be the target, the determination section 43 outputs a hit signal to the game executing section 35. If the displayed object is determined not to be the target, the determination section 43 outputs a non-hit signal to the game executing section 35.

The game executing section 35 proceeds with the game based on the hit signal and the non-hit signal. How to configure the game executing section 35 is arbitrary. According to the present embodiment, the game executing section carries out a hit processing if the hit signal has been inputted, and carries out a non-hit processing if the non-hit signal has been inputted.

According to the present embodiment, the start shooting command generating section 47 has a function of generating a validate shooting command with an operation of the controller 5 operated by the player after the start shooting command has been generated. The game executing section 35 proceeds with the game by validating the hit signal only if the validate shooting command has been outputted from the start shooting command generating section 47 within a predetermined time period after the hit signal has been outputted. Alternatively, the game executing section 35 may proceed with the game by validating all hit signals. How to proceed with the game at the time that the hit signal is not validated is arbitrary.

How to configure the hit processing and non-hit processing is arbitrary. For example, the hit processing and non-hit processing may include a step of notifying the player of the hit/non-hit of an imaginary bullet against the target after reflecting the result of the hit/non-hit in the game executed by the game executing section 35. According to the present embodiment, a vibration generating section 49, a sound producing section 51 and a hit image displaying section 53 are disposed to notify the player of a hit shot of imaginary bullet. The game executing section 35 outputs a command to apply the hit processing and non-hit processing to the vibration generating section 49, the sound producing section 51 and the hit image displaying section 53. The vibration generating section 49 is disposed in the controller 5 of FIG. 1. Such vibration generating section 49 allows the player to tactually know that the imaginary bullet has hit the target by conveying vibration to the body of the player, with the vibration generating section in operative condition in the hit processing. As a result, the player can confirm the hit shot through vibration even when they are absorbed in operating the toy tank 3 or playing the battle game.

In this example, the sound producing section 51 allows players to aurally know that the imaginary bullet has hit the target with the sound producing section 51 in operative condition. Namely, the sound producing section 51 makes a predetermined sound such as explosion from a speaker (not illustrated) disposed in the controller 5 when the imaginary bullet has hit the target. The sound is emitted from the sound emitting portion 26 of FIG. 1. Combination of vibrations given by the vibration generating section 49 and sounds from the sound producing section 51 allows the player to feel more reality.

Further, according to the present embodiment, a hit image displaying section 53 is provided to generate a command necessary to display on the first split display screen 23 of the image displaying section 39 of FIG. 1 an image allowing the hit shot of the imaginary bullet to be visually confirmed based on the hit signal outputted in accordance with the determination result made by the determination section 43. The image displaying section 39 displays an image of the imaginary bullet having hit the target on the first split display screen 23 based on the command from the hit image displaying section 53 in an appropriate manner. For example, a depiction of explosion may be overlapped on the image of the target on the first split display screen 23. In this manner, along with the vibration generating section 49 and the sound producing section 51, the player can feel much more reality.

According to the present embodiment, image signals captured by the toy tanks 3 and 3' are transmitted and received mutually via the opponent player's controller 5'. Accordingly, image signals inputted into the image displaying section 39 are transmitted to the opponent player's controller 5' via the communication section 57. To display images captured by the opponent player's toy tank 3' on the second split display screen 25, the image signals transmitted from the opponent player's controller 5' and received in the communication section 57 are inputted into the image signal receiving section 37. The image signal receiving section 37 distinguishes the image signals from the opponent player's controller 5' from those of its own toy tank 3, and then transmits them to the image displaying section 39. The image displaying section 39 displays an image based on the image signals of the opponent player's controller 5' on the second split display screen 25.

According to the present embodiment, a hit notifying section 55 is provided to transmit the hit signals also to the opponent player's controller 5' via the communication section 57. When the game executing section 35 validates a hit signal, it is transmitted to the hit notifying section 55. The hit notifying section 55 outputs a hit notifying signal, which notifies the opponent player's controller 5' that the hit signal has been validated, to the communication section 57. The communication section 57 transmits to the opponent player's controller 5' a hit notifying signal notifying that the hit signal has been validated. The communication section 57 outputs a shot signal to a shot image displaying section 59 if it receives a hit notifying signal from the opponent player's controller 5' telling that the hit signal of the opponent player has been validated. The shot image displaying section 59 displays an image of being shot on the second split display screen 25 if the hit notifying signal telling that the hit signal has been validated is received from the opponent player's controller 5' via the communication section 57.

The hit notifying signal is also transmitted to the game executing section 35 and the game executing section 35 further proceeds with the game in response to the hit notifying signal. In this manner, since an image of the target being shot by the imaginary bullet is displayed on the second split display screen 25 of the opponent player's toy, the player can promptly confirm that his/her toy tank 3 has been attacked and shot by the opponent player's shot. As a result, pleasure in playing the battle game can be increased. When the target is something moving such as the toy tank 3, it is necessary not only to hit the opponent player's toy tank 3' but also to move the player's toy tank 3 to ward off the shooting of the opponent player so as not to be shot. Accordingly, another pleasure of devising a strategy can be increased. Though the opponent player's toy tank is the target in the above-mentioned embodiment, the player can play the shooting game by himself/herself by determining a stationary object or an uncontrollable movable toy to be the target, of course. When the shooting game is played by only one player, an image of the target may be displayed on one of the first and second split display screens. In this case, the other split display screen displays nothing including the shooting results, etc. The image of the target may be divided into two to be separately displayed on the split display screens.

Figure 7:
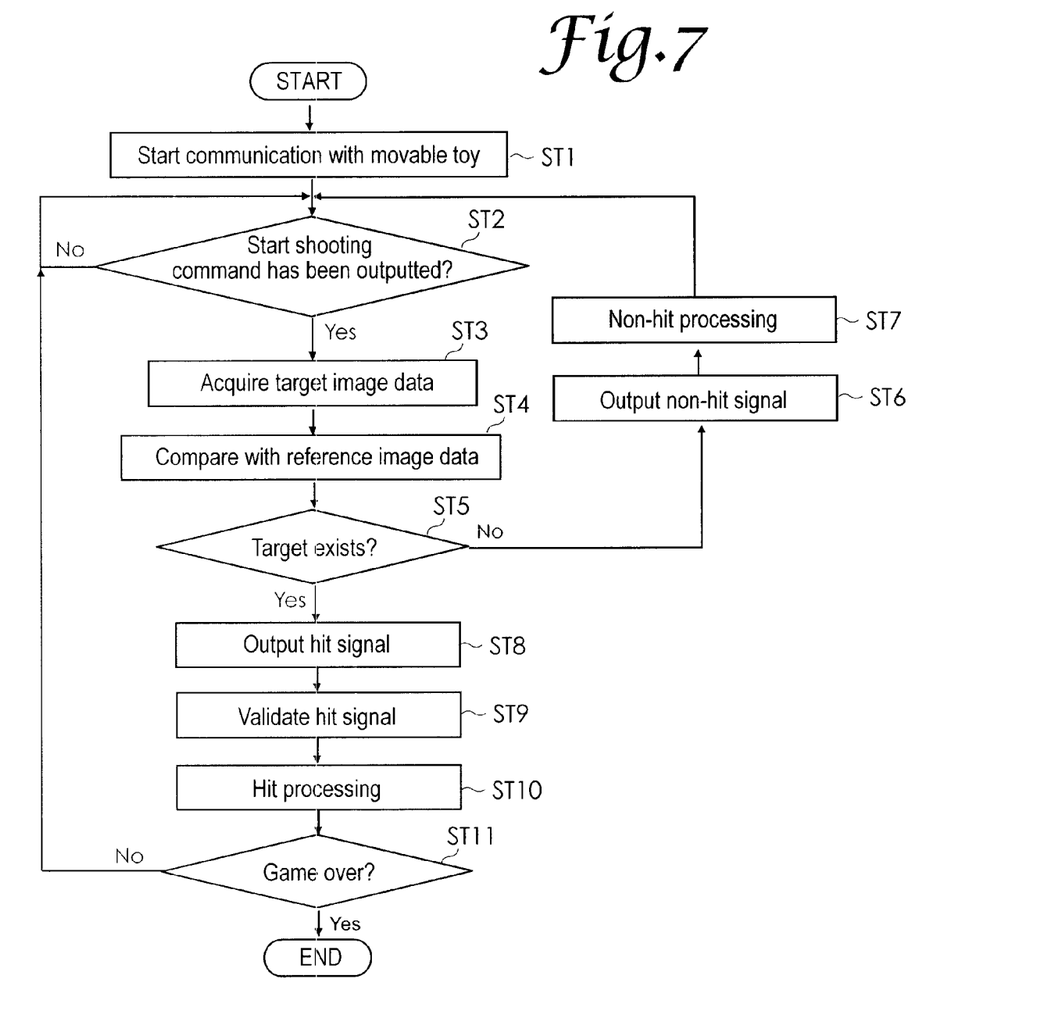
FIG. 7 is a flowchart showing a program algorithm to be used for implementing the embodiment of FIG. 1 without using a validate shooting command.

FIG. 7 is a flowchart showing an exemplary software algorithm executed by microcomputer for implementing a principal portion of the signal processing circuit of FIG. 5. This is a flowchart of the software algorithm to be used in particular when all hit signals are validated by the game executing section.

First, in step 1, the controller 5 of the shooting toy 1 starts communication with the movable toy tank 3 and is ready for transmitting/receiving control signals. Then, image signals transmitted from the movable toy are displayed on the first split display screen 23. If communication starts, it is determined in step ST2 whether or not the start shooting command has been outputted. If it is determined that the start shooting command has not been outputted, the algorithm is in a standby state till the start shooting command has been outputted.

If it is determined in step ST2 that the start shooting command has been outputted, the target image data acquiring section 41 determines as a target image an image displayed on the display screen, and acquires target image data about the target image from an image signal in step ST3.

In step ST4, the determination section 43 compares the acquired target image data with the reference image data stored in the reference image data storing section 45. If the determination section 43 determines in step ST5 that the target image data includes no object that may become the target (If NO), it outputs a non-hit signal to the game executing section 35 in step ST6. Next, in step ST7, non-hit processing is carried out by the game executing section 35 and the process of the algorithm returns to step ST2. Then, in step ST2, the algorithm is in a standby state till another start shooting command is outputted.

If the determination result given in step ST5 is YES, the process proceeds to step ST8, where the determination section 43 outputs a hit signal to the game executing section 35 and the game executing section 35 proceeds with the game by validating all the outputted hit signals (step ST9). In step 10, the hit processing is carried out, where the player is notified that the hit signal has been validated by the vibration generating section 49, the sound producing section 51 and/or the hit image displaying section 53. Then the hit processing is completed.

In step ST11, it is determined whether or not a given condition for terminating the game has been satisfied or whether or not an input for terminating the shooting is given by the player. If the input for terminating the shooting is not given, the process returns to step ST2 and is in a standby state till another start shooting command is outputted. If the input for terminating the battle or the like is given, the battle is terminated. The above algorithm is merely an example, and another algorithm may be applicable.

Figure 8:
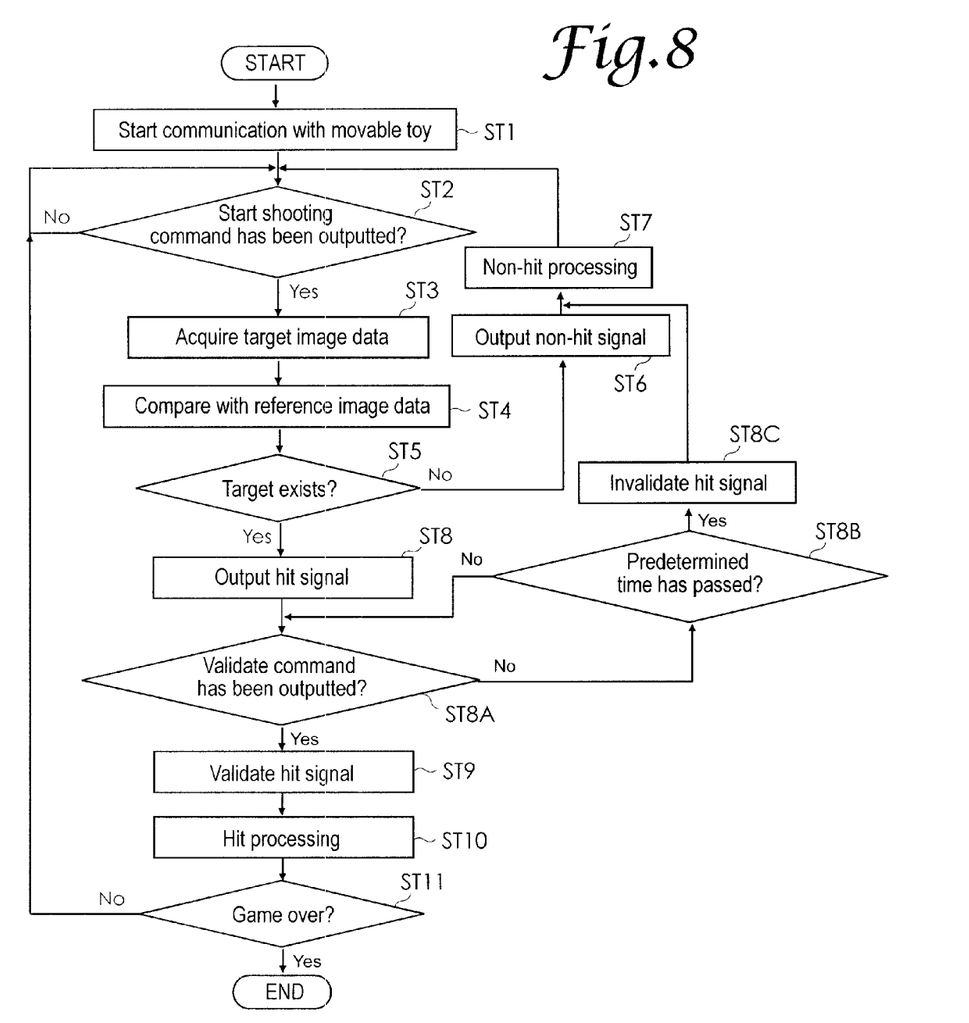
FIG. 8 is a flowchart showing a program algorithm to be used for implementing the embodiment of FIG. 1 using the validate shooting command.

FIG. 8 is a flowchart of an exemplary software algorithm to be used when the start shooting command generating section 47 has a function of generating a validate shooting command and the game executing section 35 proceeds with the shooting game by validating the hit signal only if the validate shooting command has been generated within a predetermined time period after the hit signal has been outputted. In the algorithm of FIG. 8, steps ST8A to ST8C are added between step ST8 and step ST9 of the algorithm of FIG. 7. The other steps are the same as those of FIG. 7, and description thereof will be omitted.

In this algorithm, if the hit signal is outputted in step ST8, it is determined whether or not the validate shooting command is generated from the start shooting command generating section 47 with an operation of the controller 5 by the player after the start shooting command has been outputted (step ST8A). If it is determined that the validate shooting command is not generated, the process proceeds to step ST8B, and it is determined whether or not a predetermined time has passed. If the predetermined time has not passed, the process returns to step ST8A and is in a stand-by condition till the validate shooting command is generated. If it is determined that the predetermined time has passed in step ST8B, the process proceeds to step ST8C where the outputted hit signal is not validated, then proceeds to step ST7 where the non-hit processing is carried out. Then, the algorithm is in a standby state till another start shooting command is outputted again in step ST2.

When it is determined in step ST8A that the validate shooting command has been outputted, the game executing section 35 proceeds with the game by validating the hit signal in step ST9. Here, the predetermined time period after the hit signal has been outputted can be regarded as a time period during which the target is being captured or in a lock-on state, and the shooting can be configured to hit the target only in the lock-on state. As a result, the proceeding of the game can be more thrilling.

Figure 9:
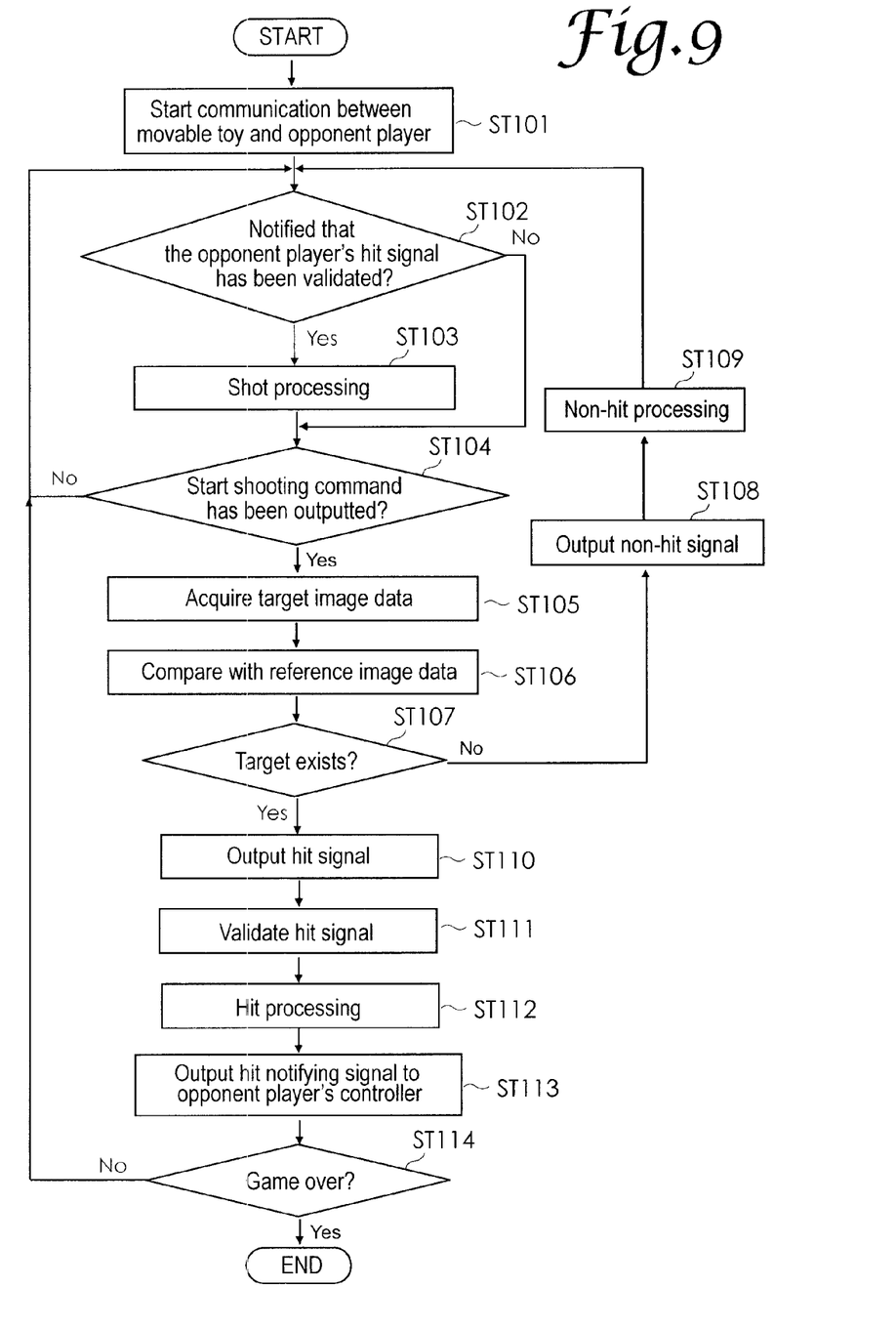
FIG. 9 is a flowchart showing a program algorithm to be used for implementing the embodiment of FIG. 4 without using the validate shooting command.

FIG. 9 is a flowchart of a software algorithm to be used on one shooting toy when two players participate in the shooting game (namely, a battle-type shooting game) and in particular when the game executing section 35 validates all hit signals. First, in step ST101, the controller 5 of the shooting toy 1 starts communication with the toy tank 3 (movable toy) and with the controller 5' of an opponent player and is ready for transmitting/receiving control signals and image signals therebetween. The image signals transmitted from the movable toy 3 are displayed on the first split display screen 23, and the image signals transmitted from the opponent player's controller 5' are displayed on the second split display screen 25. If the communication starts, it is determined in step ST102 whether or not the hit notifying signal telling that the hit signal has been validated has been received from the opponent player's controller 5'. If the hit notifying signal has been received, the process proceeds to step ST103. In step ST103, the shot displaying section 59 displays an image of being shot on the second split display screen 25 so as to notify the player that the toy tank 3 has been shot with the opponent player's imaginary bullet. Alternatively, the vibration generating section 49 and the sound producing section 51 may be used to notify the player of being shot if the hit notifying signal telling that the hit signal has been validated has been received.

If such shot processing is completed in step ST103, the algorithm process proceeds to step ST104. If the hit notifying signal is not received in step ST102, the process skips directly to step ST104. Since steps ST104 to ST112 are substantially the same as steps ST2 to ST10 of FIG. 7, description thereof is partially omitted. In the algorithm of FIG. 9, if the hit signal is validated in step ST111, the hit processing is carried out in step ST112 and then in step ST113, the hit notifying section 55 transmits via the communication 57 to the opponent player's controller 5' a hit notifying signal telling that the hit signal has been validated. Then, in step ST114, it is determined whether or not a given requirement for terminating the game has been satisfied or whether or not an input to terminate the shooting has been given by the player. If the input to terminate shooting is not given, the process returns to step ST102 and determines whether or not it is notified from the opponent player's controller 5' that the hit signal has been validated again. If the input to terminate the battle has been given, the battle game is then terminated. The above mentioned algorithm is merely an example and another algorithm may be applicable.

When communicating with opponent players, the target may not be the other party's movable toy. A target may be common to both parties, or each player may have an object different from each other as the target.

Figure 10:
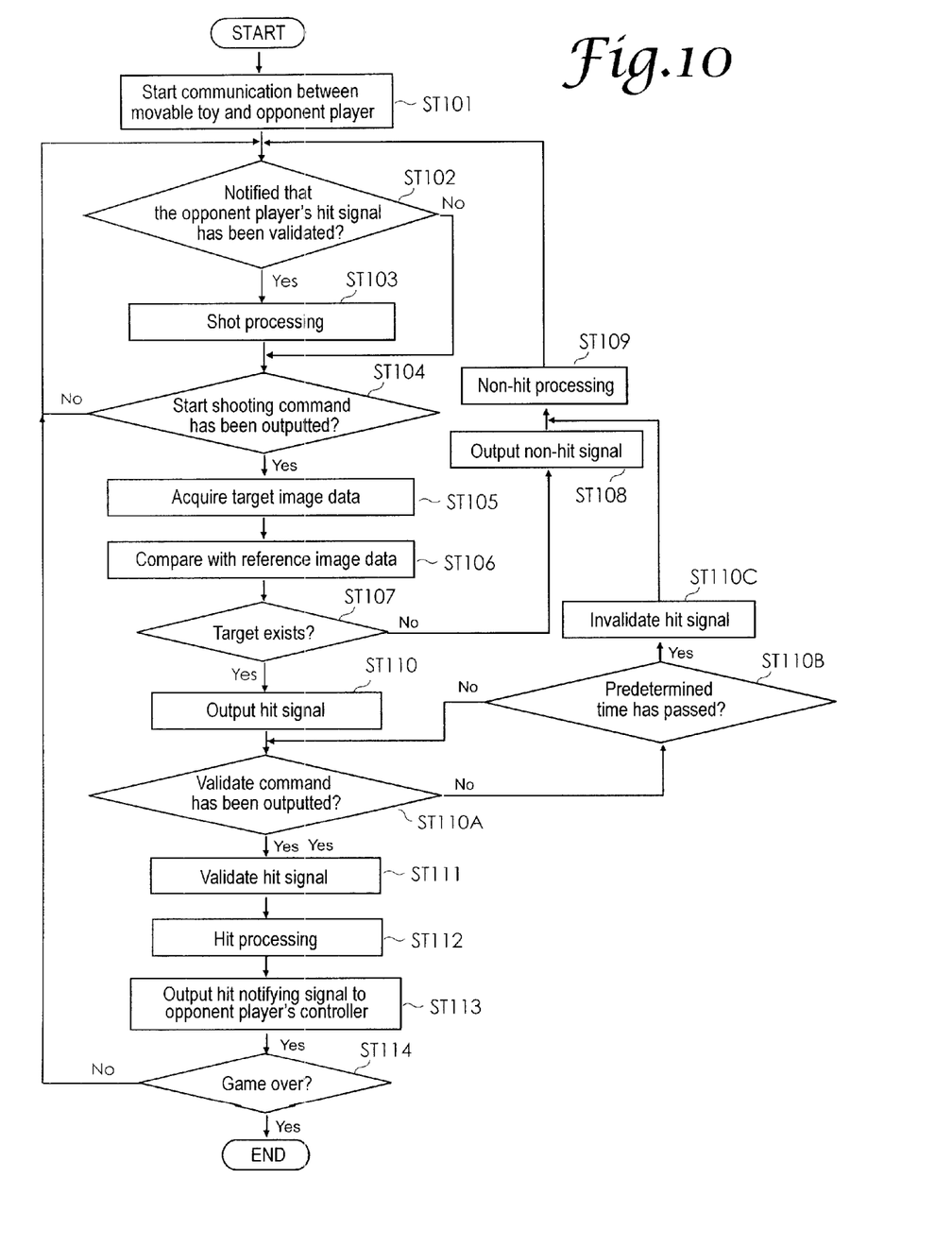
FIG. 10 is a flowchart showing a program algorithm to be used for implementing the embodiment of FIG. 4 using the validate shooting command.

FIG. 10 is a flowchart of an software algorithm to be used when the start shooting command generating section 47 has a function of generating a validate shooting command, and the game executing section 35 proceeds with the shooting game played by two players by validating the hit signal only if the validate shooting command has been generated within a predetermined time period after the hit signal has been outputted. In the algorithm of FIG. 10, steps ST110A to ST110C are added between the step ST110 and step ST111 of the algorithm of FIG. 9, and description of the other steps will be omitted because they are the same as those of FIG. 9. Description of the steps ST110A to ST110C in the algorithm of FIG. 10 will be omitted since they are substantially the same as the steps ST8A to ST8C of FIG. 8.

According to the above-mentioned embodiments, since it is determined whether or not a shot has hit the target by means of image recognition, neither infrared signal used for shooting nor signal transmitting section to confirm the hit shot are necessary for targets. Accordingly, any object can be chosen arbitrarily as the target, which can thus prevent the game from being tedious.

INDUSTRIAL APPLICABILITY

According to the present invention, whether or not shooting has resulted in hitting the target is determined based on image recognition. Thus neither infrared signal nor signal transmitting section need to be used for targets in the present invention, and any object can be arbitrarily chosen as a target. Images captured by the image capturing section of the movable toy operated by the player are displayed on the first split display screen and images captured by the image capturing section of the movable toy operated by the opponent player are displayed on the second split display screen. Thus in the present invention, the player can know whether or not the images being captured by the opponent player include an object that may become the target, namely, whether or not a shot from the opponent player's toy will hit the target. Accordingly, pleasure of working out or devising strategies in the shooting battle game with opponent player can increase.

The invention claimed is:
1. A shooting toy comprising:
a controller that generates a control signal; and
a movable toy that is remotely controllable with the control signal,
the movable toy including an image capturing section that captures an image of an object located in an area in which the movable toy exists, and an image signal transmitting section that transmits an image signal outputted from the image capturing section to the controller;
the controller including:
an image signal receiving section that receives the image signal;
an image displaying section that displays an image captured by the image capturing section on a display screen based on the received image signal, the display screen including a first split display screen and a second split display screen;
a game executing section that executes a shooting game using the captured image;
a reference image data storing section that stores reference image data about one or more reference images that are necessary to recognize a target to be shot as an image;
a start shooting command generating section that generates a start shooting command to start shooting based on an operation by a player;
a target image data acquiring section that determines as a target image to be recognized an image displayed on the display screen at the time that the start shooting command is generated, and acquires from the image signal target image data about the target image;

a determination section that determines whether or not the object whose image is displayed as the target image is the target based on the target image data and the reference image data, and outputs a hit signal if the object whose image is displayed as the target image is determined to be the target, and outputs a non-hit signal if the object whose image is displayed as the target image is determined not to be the target; and a communication section that communicates with a controller of an opponent player's shooting toy;

the image displaying section displaying on the first split display screen an image captured by the image capturing section based on the image signal received from the movable toy, and on the second split display screen an image captured by an image capturing section of a movable toy of the opponent player based on an image signal transmitted from a controller of the opponent player;

and the game executing section proceeding with the shooting game based on the hit signal and non-hit signal.

2. The shooting toy of claim 1, wherein
the game executing section is configured to proceed with the game by validating all the hit signals; and the controller includes:

a hit notifying section that notifies the opponent player's controller via the communication section that the hit signal has been validated once the hit signal has been validated; and a shot image displaying section that displays an image of being shot on the second split display screen when it is notified from the opponent player's controller via the communication section that the hit signal has been validated.

3. The shooting toy of claim 2, wherein the controller includes at least one of a hit image displaying section that displays on the display screen an image allowing the hit shot to be visually confirmed, a sound producing section that produces a sound allowing the hit shot to be aurally confirmed, and a vibration generating section that vibrates the controller to allow the hit shot to be tactually confirmed once the hit signal has been validated.

4. The shooting toy of claim 1, wherein
the start shooting command generating section has a function of generating a validate shooting command with an operation by the player after generating the start shooting command;

the game executing section proceeds with the shooting game by validating the hit signal only if the validate shooting command has been generated within a predetermined time period after the hit signal has been outputted; and the controller includes:

a hit notifying section that notifies the opponent player's controller via the communication section that the hit signal has been validated once the hit signal has been validated; and a shot image displaying section that displays an image of being shot on the second split display screen when it is notified from the opponent player's controller via the communication section that the hit signal has been validated.

5. The shooting toy of claim 4, wherein the controller includes at least one of a hit image displaying section that displays on the display screen an image allowing the hit shot to be visually confirmed, a sound producing section that produces a sound allowing the hit shot to be aurally confirmed, and a vibration generating section that vibrates the controller to allow the hit shot to be tactually confirmed once the hit signal has been validated.

6. The shooting toy of claim 1, wherein
an identification indication formed of a character, a symbol, or a figure is displayed on an outer surface of the object that may become the target; and the one or more reference images stored in the reference image data storing section are images of the identification indications.

7. The shooting toy of claim 1, wherein the target image data acquiring section acquires only an image portion of the target image located in a central portion thereof as the target image data.

* * * * *